N. M. ANDERSON.
VULCANIZER.
APPLICATION FILED APR. 10, 1916.
1,266,901.
Patented May 21, 1918.
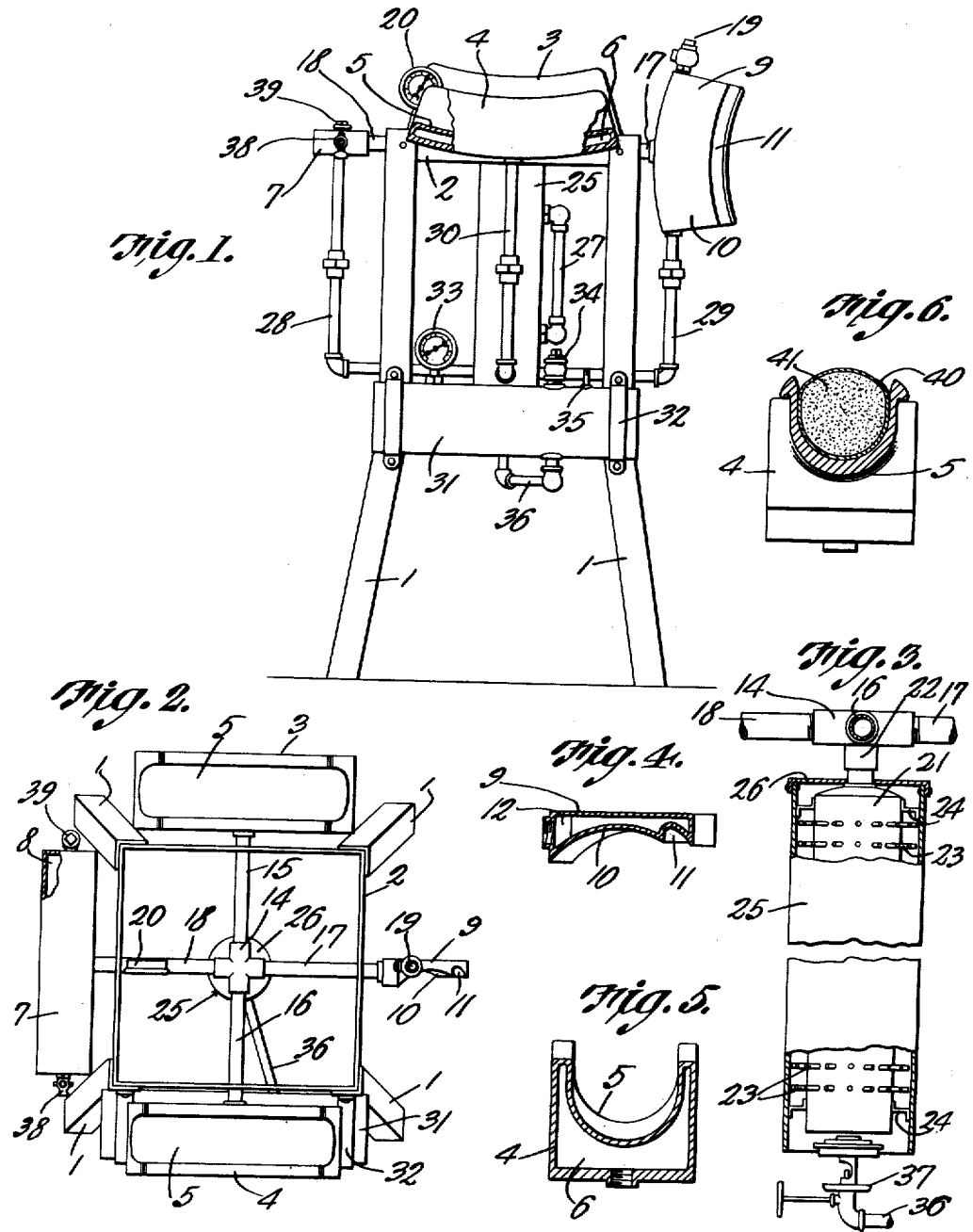
Witnesses
N. M. Anderson, Inventor
by C. A. Snow & Co., Attorneys

UNITED STATES PATENT OFFICE.

NEWTON M. ANDERSON, OF WORTHINGTON, INDIANA, ASSIGNOR OF ONE-HALF TO WILLIAM T. JEAN, OF WORTHINGTON, INDIANA.

VULCANIZER.

1,266,901. Specification of Letters Patent. Patented May 21, 1918.

Application filed April 10, 1918. Serial No. 90,180.

*To all whom it may concern:*

Be it known that I, NEWTON M. ANDERSON, a citizen of the United States, residing at Worthington, in the county of Greene and State of Indiana, have invented a new and useful Vulcanizer, of which the following is a specification.

The device forming the subject matter of this application is adapted to be employed for vulcanizing rubber by steam heat, and ordinarily is used in connection with vehicle tire casings and tubes.

One object of the present invention is to provide novel means whereby from a single boiler, a circuit of steam through all of the molds is provided.

Another object of the invention is to provide a series of molds so constructed that the tire which is being vulcanized will not be creased.

Another object of the invention is to provide novel means whereby the tire or other object which is being vulcanized, is made to conform to the molds, without the use of pads, air tubes and the like.

Another object of the invention is to improve the construction of the boiler whereby steam is supplied.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawing:—

Figure 1 shows the invention in side elevation, parts being broken away;

Fig. 2 is a top plan;

Fig. 3 is an elevation of the boiler, parts being broken away;

Fig. 4 is a cross section taken through the bead mold;

Fig. 5 is a cross section taken through one of the tire molds.

Fig. 6 is an end elevation, partly in section, depicting one of the sand bags which is used for the purpose of making the object which is being vulcanized conform to the mold.

In carrying out the present invention there is provided a supporting structure embodying legs 1 carrying a top frame 2. Disposed upon opposite sides of the top frame 1 are molds 3 and 4 of different sizes, in order to accommodate tires or casings of different dimensions. Each of the molds 3 and 4 embodies a saddle 5 curved both longitudinally and transversely so as to receive a portion of a tire or like object. Each of the molds 3 and 4 is equipped with an internal steam chamber 6. Disposed upon one side of the top frame 2 is a heating table 7 provided with a steam chamber 8. Disposed opposite to the heating table 7 is a bead mold 9 embodying a wall 10 curved to conform to the transverse curvature of a tire, the wall 10 being recessed as shown at 11, to receive the bead of the tire. The bead mold 9 ordinarily stands vertically, whereas the other molds 7, 4 and 3 are horizontally disposed. The bead mold 9 is provided with an internal steam chamber 12.

Disposed within the contour of the top frame 2 is a cross 14. From the cross 14 a steam pipe 15 extends to the mold 3, a steam pipe 16 connecting the cross with the mold 4, the mold 9 being connected to the cross by means of a pipe 17 and a pipe 18 forming a connection between the cross and the heating table 7. The mold 9 may be provided with a safety valve 19 and a pressure gage 20 may be interposed in the pipe 18.

Disposed below the top frame 2 and within the contour of the supporting structure is an upright boiler 21 connected by a pipe 22 with the cross 14. A plurality of heat conducting pins 23 are mounted in the side wall of the boiler 21, the pins 23 projecting beyond the inner face of the side wall of the boiler, and projecting outwardly beyond the outer side face of the boiler, as clearly indicated in Fig. 3. By means of radial brackets 24, the boiler 21 is connected with a tubular casing 25 spaced peripherally of the boiler and provided with a top 26 through which the pipe 22 passes. The boiler 21 is connected with a water gage 27 located exteriorly of the casing 25. From the boiler 21, a pipe 28 leads to the heating table 7, a pipe 29 connecting the boiler with the mold 9, a pipe 30 connecting the mold 4 with the boiler, the mold 3 being connected with the boiler in a similar manner.

Disposed alongside of the supporting frame and preferably secured as shown at 32 to the legs 1 is a fuel tank 31, adapted to contain gasolene or the like. The tank 31 is also adapted to contain air under pressure, and with this end in view, the tank is equipped with a pressure gage 33. A filling plug for the gasolene tank is indicated at 34 and the numeral 35 indicates a valve wherewith an air pump (not shown) may be connected. Leading from the fuel tank 31 is a fuel supply pipe 36 provided at its inner end with a burner 37, located, as clearly shown in Fig. 3, below the boiler 21.

The heating table 7 may be provided with a blow off cock 38, whereby air may be permitted to escape until the proper circulation of steam is secured, the cock 38 being of use, also, in drawing off water of condensation in the several molds. The heating table 7 may carry a filling plug 39, through which water may be introduced into the boiler 21.

In holding the object to be vulcanized upon the heating table 7 and upon the molds 3, 4 and 9 there is employed a bag 40 containing sand 41. The bag of sand shapes itself readily to the contour of the several molds and serves to hold the object to be vulcanized in proper relation with respect to the molds.

In practical operation, fuel under pressure from the tank 31 passes by way of the pipe 36 into the burner 37 and is ignited, the heated air passing upwardly within the contour of the casing 25 and heating the boiler 21, the conducting pins 23 aiding materially in raising the temperature of the water within the boiler. The steam generated within the boiler passes by way of the pipe 22, the cross 14 and the pipes 15, 18, 16 and 17 through the several molds. From the molds, the steam is returned to the boiler 21 by way of the pipes 28, 29 and 30. By the operation above described, a continuous circuit of steam through the several molds is effected, the molds being maintained at a temperature which is sufficiently high to effect a vulcanization.

Having thus described the invention, what is claimed is:—

A device of the class described comprising a rectangular frame; legs depending from the frame at the corners thereof; a connection located within the contour of the frame; pipes radiating from the connection and coöperating with the connection to form a cross having rectangularly disposed arms, the pipes being supported by the side portions of the frame, intermediate the legs; molds carried by the outer ends of the pipes and located exteriorly of the frame; a boiler disposed within the contour of the frame; a conduit leading from the boiler to the connection and constituting a support for the boiler; and return pipes leading from the molds to the boiler.

In testimony that I claim the foregoing as my own, I have hereto affixed my signature in the presence of two witnesses.

NEWTON M. ANDERSON.

Witnesses:
JACOB H. CONOICE,
M. H. FLATER.